United States Patent

Hiratani et al.

Patent Number: 5,411,667
Date of Patent: May 2, 1995

[54] METHOD OF SELECTIVELY SEPARATING LEAD IONS

[75] Inventors: Kazuhisa Hiratani; Hideki Suigihara, both of Tsukuba; Kazuyuki Kasuga, Tsuchiura, all of Japan

[73] Assignee: Director-General of Agency of Industrial Science and Technology, Japan

[21] Appl. No.: 285,155

[22] Filed: Aug. 3, 1994

[30] Foreign Application Priority Data

Aug. 26, 1993 [JP] Japan .................. 5-234087

[51] Int. Cl.6 .................................. C02F 1/26
[52] U.S. Cl. .................................. 210/638; 210/634; 210/913; 423/89; 75/723
[58] Field of Search ............ 210/634, 635, 636, 637, 210/638, 639, 913; 423/89, DIG. 14; 75/722, 723

[56] References Cited

U.S. PATENT DOCUMENTS

| | | | |
|---|---|---|---|
| 4,055,492 | 10/1977 | Rupilius et al. | 210/638 |
| 4,668,397 | 5/1987 | Shimizu et al. | 210/634 |
| 4,741,831 | 5/1988 | Grinstead | 210/638 |
| 4,765,835 | 8/1988 | Ananthapadmanabhan | 210/634 |

Primary Examiner—Cynthia L. Nessler
Attorney, Agent, or Firm—Lorusso & Loud

[57] ABSTRACT

A method of selectively separating lead ions from metal ions-containing aqueous liquid by contact with a solution containing a polyether derivative dissolved in a water-insoluble organic solvent and serving as an ionophore or carrier for lead ions. The polyether derivative is a compound expressed by the general formula:

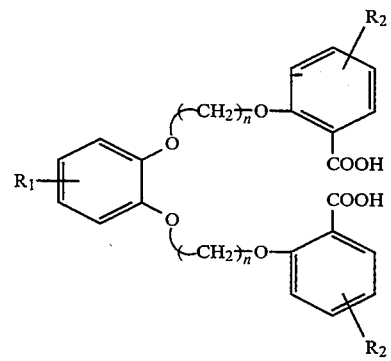

wherein $R_1$ and $R_2$ stand independently from each other for a hydrogen atom or an alkyl group and n is an integer of 2 or 3.

5 Claims, 1 Drawing Sheet

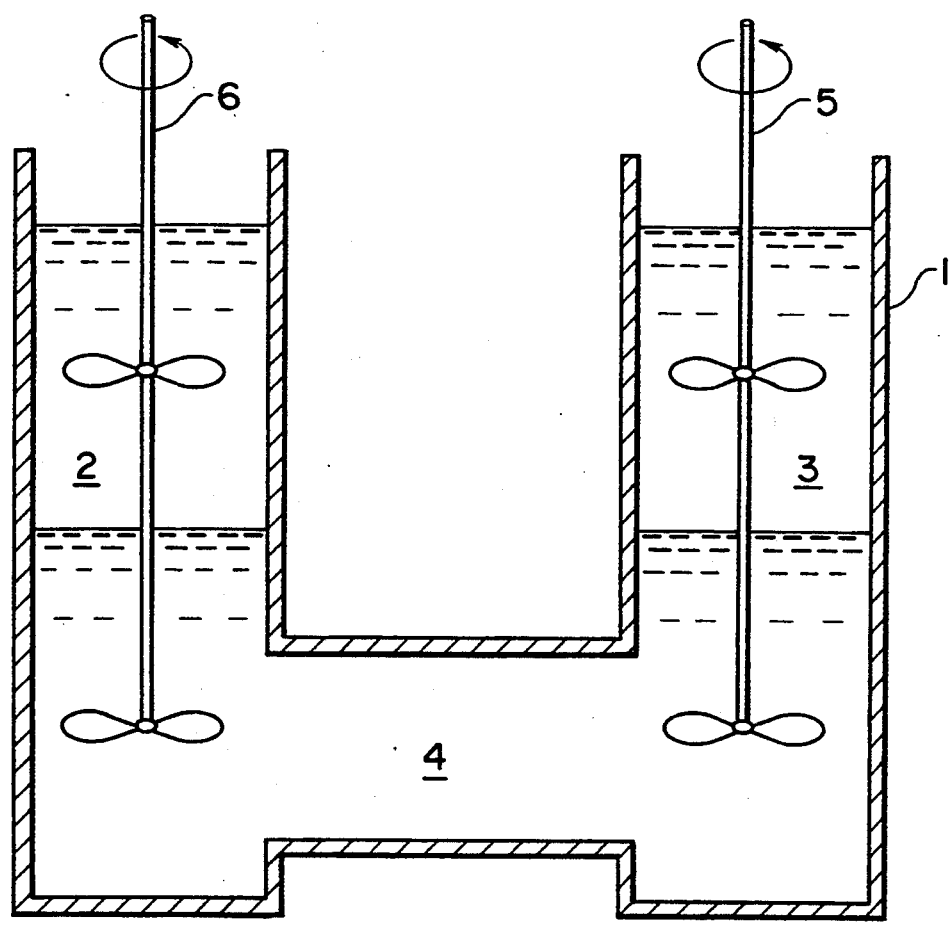

METHOD OF SELECTIVELY SEPARATING LEAD IONS

BACKGROUND OF THE INVENTION

This invention relates to a method for selectively transporting lead ions contained in a first liquid to a second liquid.

Separation of lead ions from other metal ions is a very important technique utilized for the recovery and concentration thereof. There are a lot of known extractants and ion transporting agents (ionophores) used for the separation of specific metal ions. An ionophore to be utilized for continuously transporting specific ions contained in a first liquid to a second liquid is required to selectively capture lead ions. In addition, it is important that the ionophore should release the captured ions to the second liquid in order to effectively perform the continuous transportation of the ions. Known extractants and ionophores, however, are not satisfactory for lead ions with respect to selectivity or efficiency.

Japanese Examined Patent Publication JP-B-1-14897 discloses a polyether derivative suitable as an ionophore for the transportation of alkaline earth metal ions.

SUMMARY OF THE INVENTION

It is, therefore, the prime object of the present invention to provide a method for transporting lead ions contained in a liquid to another liquid.

Another object of the present invention is to provide a method of the above-mentioned type which can continuously transport lead ions contained in a first liquid to a second liquid even when the concentration of the lead ions in the first liquid is lower than that in the second liquid.

In accomplishing the foregoing objects, there is provided in accordance with the present invention a method of transporting lead ions contained in a first aqueous liquid having a pH of greater than 3 to a second aqueous liquid having a pH of 3 or less, comprising the steps of:

contacting a carrier solution containing a polyether derivative dissolved in a water-insoluble organic solvent with said first liquid so that lead ions contained in said first liquid are captured by said polyether derivative; and contacting said carrier solution containing the lead ions captured by said polyether derivative with said second liquid so that the lead ions captured by said polyether derivative are released to said second liquid, said polyether derivative being a compound expressed by the general formula:

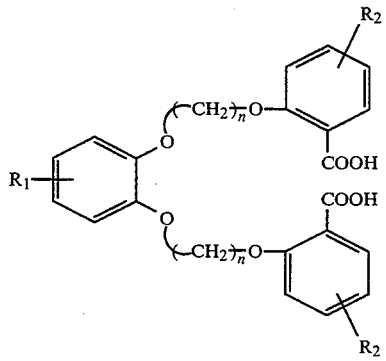

wherein $R_1$ and $R_2$ stand independently from each other for a hydrogen atom or an alkyl group and n is an integer of 2 or 3.

The above polyether derivative is a known compound and is disclosed in JP-B-1-14897.

BRIEF DESCRIPTION OF THE DRAWINGS

Other objects, features and advantages of the present invention will become apparent from the detailed description of the invention to follow when considered in light of the accompanying drawing, in which the sole FIGURE is an elevational, cross-sectional view diagrammatically showing an apparatus useful for performing the lead ion transportation according to the present invention.

DETAILED DESCRIPTION OF THE PREFERRED EMBODIMENTS OF THE INVENTION

The polyether carboxylic acid derivative according to the present invention, when subjected to a neutral or a weakly acidic condition, i.e. generally a pH region of about 3–7, can capture lead ions with a high selectivity. In an acidic condition of a pH range of about below 3, the polyether carboxylic acid derivative can liberate the captured lead ions. Thus, the polyether carboxylic acid derivative of the present invention can serve to act as an ionophore or carrier for transporting lead ions.

The transportation of lead ions can be done by contacting a first, lead ion-containing aqueous liquid having a pH of about higher than 3, preferably 4.5 to 7, with a third liquid which is an organic solvent solution containing the polyether carboxylic acid derivative of the present invention and substantially immiscible with the first liquid so that the lead ions may be captured by the polyether carboxylic acid derivative. Illustrative of suitable organic solvents are halogenated organic solvents such as chloroform, carbon tetrachloride and dichloroethane; hydrocarbons such as benzene, toluene and xylene; and alcohols such as octanol and hexanol. The concentration of the polyether carboxylic acid in the third liquid is generally in the range of $10^{-5}$ to 1.0 mol/liter, preferably $10^{-3}$ to $10^{-1}$ mol/liter.

The third liquid thus containing the lead ions captured by the polyether carboxylic acid derivative is then contacted with a second aqueous liquid having a pH of 3 or less, preferably 1 to 2.5, and substantially immiscible with the third liquid so that the captured lead ions are liberated to the second liquid. The second liquid which is to receive lead ions may be an aqueous liquid containing an inorganic acid such as hydrochloric acid, sulfuric acid or phosphoric acid or an organic acid such as formic acid, acetic acid or an organic sulfonic acid.

One example of lead ion transportation method will now be described with reference to the accompanying drawing. Referring to the FIGURE, designated by the reference numeral 1 is a U-shaped vessel equipped with stirrer means 5 and 6 in the respective vertical portions thereof. A third, polyether carboxylic acid-containing liquid is contained in the vessel 1 to form a third layer 4 with its liquid level positioned adjacent to the respective lower portions of the vertical portions. A first, lead ion-containing liquid and a second, acidic liquid are poured into the vessel 1 to form first and second layers 2 and 3, respectively, on the third layer 4.

In the interface at which the first and third layers 2 and 4 are contacted, lead ions in the layer 2 are captured by the polyether carboxylic acid contained in the layer 4, while in the interface at which the second and third layers 3 and 4 are contacted, the lead ions captured by the polyether carboxylic acid are liberated and released to the second layer 3. The stirrer means 5 and 6 are continuously operated to facilitate the capture and the liberation of lead ions. In this method, the third layer 4 should, of course, have a higher specific gravity than the other layers 2 and 3.

If desired, a suitable membrane may be disposed between the first and third liquids and between the second and third liquids. In an alternative embodiment, the carrier-containing organic solution is in the form of a liquid film with the opposite sides thereof being maintained in contact with the first and second aqueous liquid, respectively. If desired, the liquid film may be supported on a suitable permeable support means such as a filter paper or a high molecular weight membrane. The transportation may also be effected by a usual extraction method in which the first and the third liquids are vigorously shaken together to extract the lead ions with the third liquid, the lead ions contained in the third liquid being subsequently extracted with the second liquid.

With the polyether carboxylic acid derivative according to the present invention, the transportation of lead ions may be effected continuously at a very high rate. Further, even when the concentration of lead ions in the first liquid is lower than that of the second liquid, the polyether carboxylic acid derivative of this invention can carry lead ions from the first to the second liquids.

The following examples will further illustrate the present invention.

EXAMPLE 1

Selective Transportation of Pb++:

The following first, second and third solutions were prepared:

First Solution: 15 ml of an aqueous solution (pH: 6.2) containing 0.1 mol/liter of $Pb(OCOCH_3)_2$;

Second Solution: 15 ml of an aqueous 0.1N nitric acid (pH: 1.2);

Third Solution: A solution obtained by dissolving $1.5 \times 10^{-4}$ mol of the compound of Formula (I), in which n is 2, $R_1$ is a tertiary butyl group and $R_2$ is hydrogen, in 30 ml of chloroform.

These solutions were charged in an apparatus as shown in the FIGURE and were each stirred at 25° C. for two days. Atomic absorption analysis of the resulting second solution revealed that 1.08 mmol (72% of the lead ions contained in the first solution) of lead ions were transported thereto.

EXAMPLE 2

Example 1 was repeated in the same manner as described except that 15 ml of an aqueous solution (pH: 5.3) containing 0.1 mol/liter of $Pb(OCOCH_3)_2$ and 0.1 mol/liter of $Cu(OCOCH_3)_2$ was used as the first solution. Atomic absorption analysis revealed that 1.05 mmol (70% of the lead ions contained in the first solution) of lead ions and 0.03 mmol (2% of the cupric ions contained in the first solution) of cupric ions were transported to the second solution.

EXAMPLE 3

Example 1 was repeated in the same manner as described except that 15 ml of an aqueous solution (pH: 6.3) containing 0.1 mol/liter of $Pb(OCOCH_3)_2$ and 0.1 mol/liter of $Zn(OCOCH_3)_2$ was used as the first solution. Atomic absorption analysis revealed that 1.02 mmol (68% of the lead ions contained in the first solution) of lead ions and 0.003 mmol (0.2% of the zinc ions contained in the first solution) of zinc ions were transported to the second solution.

EXAMPLE 4

Example 1 was repeated in the same manner as described except that 15 ml of an aqueous solution (pH: 6.2) containing 0.1 mol/liter of $Pb(OCOCH_3)_2$ and 0.1 mol/liter of $Cd(OCOCH_3)_2$ was used as the first solution. Atomic absorption analysis revealed that 0.96 mmol (64% of the lead ions contained in the first solution) of lead ions and 0.014 mmol (0.9% of the cadmium ions contained in the first solution) of cadmium ions were transported to the second solution.

EXAMPLE 5

Example 1 was repeated in the same manner as described except that 15 ml of an aqueous solution (pH: 6.5) containing 0.1 mol/liter of $Pb(OCOCH_3)_2$ and 0.1 mol/liter of $Ba(OCOCH_3)_2$ was used as the first solution. Atomic absorption analysis revealed that 0.93 mmol (62% of the lead ions contained in the first solution) of lead ions and 0.021 mmol (1.4% of the barium ions contained in the first solution) of barium ions were transported to the second solution.

COMPARATIVE EXAMPLE 1

Example 1 was repeated in the same manner as described except that 15 ml of an aqueous solution (pH: 5.8) containing 0.1 mol/liter of $Cu(OCOCH_3)_2$ only was used as the first solution. Atomic absorption analysis revealed that 0.27 mmol (18% of the cupric ions contained in the first solution) of cupric ions were transported to the second solution.

EXAMPLE 6

Example 1 was repeated in the same manner as described except that a solution obtained by dissolving $1.5 \times 10^{-4}$ mol of the compound of Formula (I), in which n is 3, $R_1$ is a tertiary butyl group and $R_2$ is hydrogen, in 30 ml of chloroform was used as the third solution. Atomic absorption analysis revealed that 0.33 mmol (22% of the lead ions contained in the first solution) of lead ions were transported to the second solution.

EXAMPLE 7

Example 2 was repeated in the same manner as described except that a solution obtained by dissolving $1.5 \times 10^{-4}$ mol of the compound of Formula (I), in which n is 3, $R_1$ is a tertiary butyl group and $R_2$ is hydrogen, in 30 ml of chloroform was used as the third solution. Atomic absorption analysis revealed that 0.39 mmol (26% of the lead ions contained in the first solution) of lead ions and 0.06 mmol (4% of the cupric ions contained in the first solution) of cupric ions were transported to the second solution.

COMPARATIVE EXAMPLE 2

Example 1 was repeated in the same manner as described except that a solution obtained by dissolving $1.5 \times 10^{-4}$ mol of dicylohexyl-18-crown-6 (J. Am. Chem. Soc., 102, 2452 (1980)) in 30 ml of chloroform was used as the third solution. Atomic absorption analysis revealed that only 0.003 mmol (0.2% of the lead ions contained in the first solution) of lead ions were transported to the second solution.

From the results shown in the foregoing examples, it will be appreciated that the process according to the present invention can effectively transport lead ions. In particular, a difference in pH between the first and second aqueous solutions permits the transportation of lead ions even when the concentration thereof in the first solution is lower than that in the second solution. Additionally, lead ions are preferentially and selectively transported from a solution in which other ions such as cupric ions, zinc ions, cadmium ions and barium ions coexist. It is also seen that the polyether carboxylic acid derivative of the formula (I) in which n is 2, $R_1$ is a tertiary butyl group and $R_2$ is hydrogen shows better lead ion separating performance in comparison with the similar compound in which n is 3. Comparative Example 2 reveals that the known crown compound is ill-suited for the purpose of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What Is claimed Is:

1. A method of transporting lead ions contained in a first aqueous liquid having a pH of greater than 3 to a second aqueous liquid having a pH of 3 or less, comprising the steps of:

contacting a carrier solution containing a polyether derivative dissolved in a water-insoluble organic solvent with said first liquid so that lead ions contained in said first liquid are captured by said polyether derivative; and contacting said carrier solution containing the lead ions captured by said polyether derivative with said second liquid so that the lead ions captured by said polyether derivative are released to said second liquid, said polyether derivative being a compound expressed by the general formula:

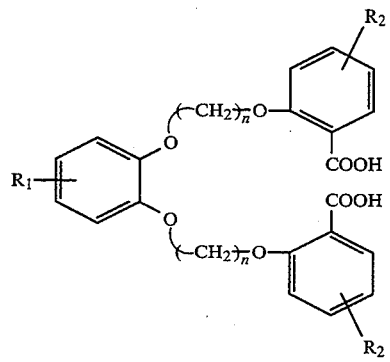

wherein $R_1$ and $R_2$ stand independently from each other for a hydrogen atom or an alkyl group and n is an integer of 2 or 3.

2. A method as set forth in claim 1, wherein $R_1$ stands for a tertiary butyl group, $R_2$ stands for a hydrogen atom and n is an integer of 2.

3. A method as set forth in claim 1, wherein said first liquid has a pH of 4.5 to 7 and said second liquid has a pH of 1 to 2.5.

4. A method as set forth in claim 1, wherein said organic solvent is selected from the group consisting of hydrocarbons, halogenated hydrocarbons and water insoluble alcohols.

5. A method as set forth in claim 1, wherein said organic solvent is chloroform.

* * * * *